April 14, 1942. H. F. TÖNNIES 2,279,723
PHOTOELECTRIC EXPOSURE DETERMINING APPARATUS
Filed Dec. 9, 1938
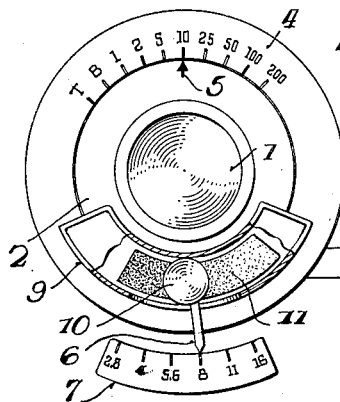
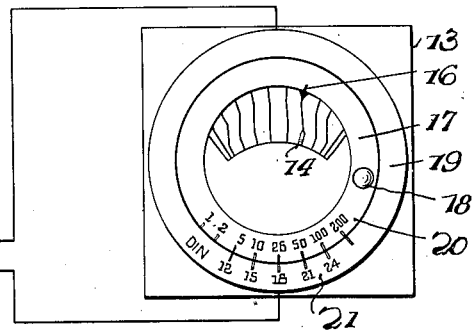
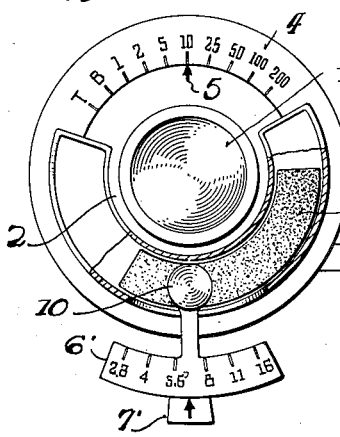
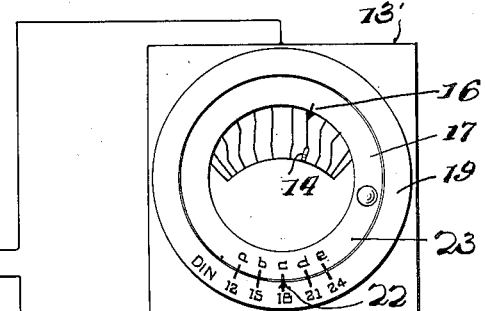
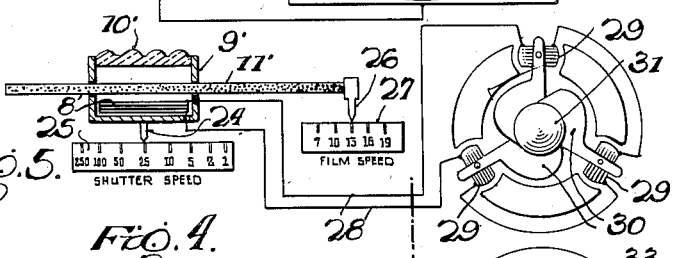
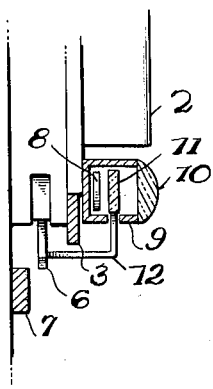
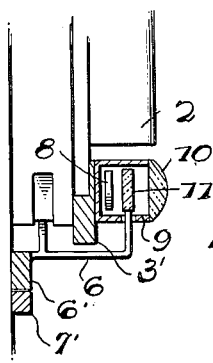

Patented Apr. 14, 1942

2,279,723

UNITED STATES PATENT OFFICE 2,279,723

PHOTOELECTRIC EXPOSURE DETERMINING APPARATUS

Hans Ferdinand Tönnies, Hamburg-Grossflottbek, Germany

Application December 9, 1938, Serial No. 244,859
In Germany September 4, 1937

7 Claims. (Cl. 95—10)

This invention relates to photoelectric exposure determining apparatus for use in the manual or automatic adjustment of the exposure apparatus, i. e. the shutter and the diaphragm, of a camera.

This invention is particularly adapted for use in determining the shutter timing or the diaphragm opening when the average scene brightness lies within a range that permits automatically timed exposures by the camera shutter, since relatively small photoelectric cells and associated elements may then be used, but the invention is not limited to any given cell dimensions as significant indications may be obtained at low brightness values when cells of sufficient size are employed. This application is a continuation-in-part of my copending applications Ser. Nos. 227,579 and 227,580, filed August 30, 1938.

An object of the invention is to provide photoelectric exposure determining apparatus including a photoelectric cell, a photometric wedge in front of the cell, an instrument connected to the cell, and mechanism for altering the relative position of the cell and wedge in accordance with the preselected value or values of one or more exposure factors. An object is to provide apparatus of the type stated in which the photoelectric cell and the photometric wedge are individually adjustable in accordance with preselected values of different exposure factors. More specifically, an object is to provide exposure determining apparatus of the photoelectric type in which a photoelectric cell and a photometric wedge are supported for independent movement on the lens housing of a camera, and the cell and wedge are connected to and movable by the devices that regulate the shutter speed and the diaphragm opening, respectively, of the camera.

These and other objects and advantages of the invention will be apparent from the following specification when taken with the accompanying drawing in which:

Fig. 1 is a front elevation of an embodiment of the invention;

Fig. 2 is a fragmentary sectional view of the photocell and associated elements;

Fig. 3 is a front elevation of an embodiment in which the photocell and the photometric wedge are individually adjustable;

Fig. 4 is a fragmentary sectional view of the same;

Fig. 5 is a diagrammatic view of an application of the invention to the automatic control of a camera diaphragm; and Figs. 6 and 7 are fragmentary views which, in combination with Fig. 5, illustrate other applications of the invention.

In the drawing, the reference numeral 1 identifies a camera lens in a housing 2 on which the ring 3 is angularly adjustable to control the usual shutter mechanism, not shown, in accordance with the position of the scale 4 of shutter speeds with respect to a mark 5 on the housing 2. The camera diaphragm is controlled by the adjustment of a lever 6 along the scale 7 of diaphragm openings.

In accordance with the invention, a photocell 8 of the current generating type is mounted in a housing 9 that is fixed to the lens housing 2 and has a lens 10 for restricting the acceptance angle of the cell substantially to the image angle of the lens 1. A translucent photometric wedge 11 of progressively varying density and of elongated arcuate form is movable within the housing 9, in front of the cell 8, and is connected to the lever 6 by an arm 12. The cell 8 is connected to a measuring instrument 13 having a moving system carrying a pointer 14 that is movable over a scale plate having a series of approximately radial lines that are uniformly spaced at their outer ends and are spaced at their inner ends in accordance with pointer displacements for successive increments, on a geometric scale, of light values. The index mark 16 of the instrument is carried by a ring 17 that is adjustable by a pin 18 within an outer ring 19, the rings 17, 19 having cooperating scales 20, 21, respectively, of shutter speeds and film speeds.

The apparatus is employed in the following manner to set the camera exposure mechanism in accordance with preselected exposure factor values and the existing scene brightness. Ring 3 is adjusted on the lens housing 2 for a desired exposure time and the indicator ring 17 is then adjusted to aline the selected exposure time graduation of scale 20 with the emulsion speed value of the film on scale 21. The camera is focused on the scene and the diaphragm lever 6 is adjusted to that value at which the pointer 14 alines with the indicator mark 16. The adjustment of the lever 6 effects a modulation of the current flow to the instrument 13 since the photometric wedge 11 is moved with respect to the cell 8 when the diaphragm opening is varied by shifting the lever 6. This relative movement of the translucent wedge and the cell alters the ratio of the light rays reaching the cell to the total light rays approaching the cell within the preselected acceptance angle, but neither the effective cell area nor the acceptance angle of the cell is altered by any relative adjustment of the translucent photometric wedge and the cell.

Both the cell 8 and the wedge 11 are adjustable in the embodiment shown in Figs. 3 and 4. The cell housing 9 is secured to the shutter adjusting ring 3', and the photometric wedge 11, as in the previously described embodiment, is connected to and adjustable by the diaphragm setting lever 6 that carries a diaphragm scale 6' for cooperation with a fixed mark 7'. The instrument 13' has adjustable rings 17, 19 for setting the indicator mark 16 in accordance with film speed. The ring 19 has a mark 22 for alinement with the selected film speed value of scale 21 for a normal exposure, and preferably has a scale 23 of symbols or absolute values for setting the ring 17 when using filters and/or lenses of different acceptance angles. The illustrated symbols are the letters "a, b—e" and the particular symbol that is to be set in line with the film speed value of scale 21 may be determined from a tabulation of filter factors and lens angles.

The apparatus is set for use by adjusting ring 17 in accordance with film speed and any additional exposure factor represented by scale 23, and the camera is focused on the scene. Either the camera shutter or the diaphragm, or both, may be adjusted to obtain that relative location of the cell 8 and wedge 11 which establishes the current flow that alines the pointer 14 with the mark 16.

The independently movable cell and wedge may be used in other types of exposure determining apparatus. As shown diagrammatically in Fig. 5, the cell 8' is mounted in a housing 9' and back of an optical system 10' for limiting the acceptance angle of the cell. The housing 9' is movable parallel to the plane of the photometric wedge 11' and has an adjusting arm or pointer 24 which travels along a scale plate 25 of shutter speed values to indicate the adjustment of the housing as a function of shutter speed. An adjusting arm or pointer 26 is attached to the wedge 11' and moves along a scale plate 27 that is graduated in emulsion speeds. The cell 8' is connected by leads 28 to the pivoted coils 29 of a measuring instrument, the coils carrying diaphragm blades 30 for adjusting the effective opening of the camera lens 31 in accordance with the existing scene brightness and the preselected values of shutter speed and emulsion speed.

The fragmentary view, Fig. 6, indicates that the automatic shutter may be replaced by a measuring instrument 32 having a scale 33 graduated in diaphragm openings. Alternatively, as shown by the fragmentary view, Fig. 7, the current output from the cell 8' may pass to an instrument coil 34 through a current choke comprising the resistor 35 and a contact arm 36 that is the lever member for adjusting the iris diaphragm 37 of a camera lens 38. A fixed index mark 39 indicates the critical position of the instrument pointer 40 when the camera diaphragm is properly set for the scene brightness and the preselected values of shutter speed and emulsion speed.

It is to be understood that there is considerable latitude in the design and construction of photoelectric exposure determining apparatus in which the current flow from the cell is modulated by a photometric wedge, and that various changes may be made in the described apparatus without departure from the spirit of my invention as set forth in the following claims.

I claim:

1. In a photoelectric system for use in determining exposure conditions for a camera, a photoelectric cell, a housing for said cell, means including said housing restricting the acceptance angle of said cell to a predetermined fixed value, an instrument connected to said cell and having a movable pointer and adjustable indicator mark, means movable with respect to a scale graduated in values of an exposure factor for adjusting said indicator mark, and means for adjustably attenuating the light rays incident upon the entire cell area and approaching the same over said acceptance angle; said attenuating means comprising an elongated translucent photometric wedge of progressively varying density, means supporting said cell and said wedge for relative movement, and means movable with respect to a scale graduated in values of another exposure factor for effecting relative movement of said cell and photometric wedge.

2. In a photoelectric system for use in determining exposure conditions for a camera, a photoelectric cell, a housing for said cell, means including said housing restricting the acceptance angle of said cell to a predetermined fixed value, an instrument connected to said cell and having a movable system that is deflected as a function of the current output of said cell, and means for adjustably attenuating the light rays incident upon the entire cell area and approaching the same over said acceptance angle; said attenuating means comprising an elongated translucent photometric wedge of progressively varying density, means supporting said cell and said wedge for movement with respect to each other, and independently operable means for moving said cell and for moving said wedge respectively, said moving means each including a member displaceable with respect to scales graduated in value of an exposure factor.

3. In a photoelectric system for use in determining exposure conditions for a camera, a photoelectric cell mounted within a housing, an optical refractive member extending over the outer end of said housing to restrict the acceptance angle of said cell to a predetermined fixed value, a translucent photometric wedge extending through said housing in front of said cell, an instrument connected to said cell, means supporting said cell housing and wedge for relative movement, and means independently adjustable along associated scales graduated in values of exposure factors for moving said cell housing and said wedge respectively with respect to each other.

4. In a photoelectric system for use in adjusting camera exposure mechanism comprising a member adjustable to regulate shutter speed and a member adjustable to regulate the camera diaphragm, a photoelectric cell mounted within and at the inner end of a housing, an optical refractive member extending across the outer end of said housing to admit light rays to said cell over a predetermined acceptance angle, a photometric wedge of progressively varying density extending through said housing in front of said cell, means supporting said cell housing and said wedge for movement independently of each other, means coupling said cell housing to one member for movement thereby, means coupling said wedge to the other member for movement thereby, and an instrument connected to said cell.

5. Exposure determining apparatus comprising a measuring instrument having a pointer and an indicator mark with which said pointer is to be alined, a photoelectric cell, a movable housing carrying said cell, an elongated light transmitting plate of progressively varying light absorption from one end to the other, said plate extending through said housing and being movable in front of said cell, a shutter adjusting member carrying said housing, and a diaphragm adjusting member secured to said plate for moving the same.

6. Photoelectric apparatus comprising a photocell, a movable housing for said photocell, a photometric wedge of progressively varying density extending through said housing in front of said photocell, means including scale graduations for independently adjusting said housing and said wedge in accordance with selected values of different exposure factors, a lens diaphragm including a plurality of movable blades, and an instrument connected to said photocell for actuating said diaphragm blades.

7. In a photoelectric exposure determining system of the type including a photoelectric cell, a housing having said cell mounted within the same at the inner end thereof, an optical refractive member extending over the outer end of said housing to limit the acceptance angle of said cell to a predetermined fixed value, an instrument connected to said cell and having a pointer adapted to be alined with a fixed mark, a photometric wedge of progressively varying density extending through said housing in front of said cell, means including a member movable along a scale of an exposure factor for moving said cell housing with respect to said wedge, means including a member movable along a scale of another exposure factor for moving said wedge with respect to said cell housing, and a current choke for modulating current flow from said cell to said instrument, said current choke including a member adjustable with an exposure-controlling element of a camera.

HANS FERDINAND TÖNNIES.